PULSE PRODUCING DEVICE

Filed Jan. 23, 1957 2 Sheets-Sheet 1

Inventor
K.W.CATTERMOLE -
R.B.HERMAN
By Robert Harding Jr.
Attorney

Oct. 11, 1960 K. W. CATTERMOLE ET AL 2,956,176

PULSE PRODUCING DEVICE

Filed Jan. 23, 1957 2 Sheets-Sheet 2

Inventor
K.W.CATTERMOLE-
R.B.HERMAN
By Robert T. Harding Jr.
Attorney

United States Patent Office 2,956,176

Patented Oct. 11, 1960

2,956,176

PULSE PRODUCING DEVICE

Kenneth William Cattermole and Ralph Bertrand Herman, London, England, assignors to International Standard Electric Corporation, New York, N.Y.

Filed Jan. 23, 1957, Ser. No. 635,878

Claims priority, application Great Britain Jan. 25, 1956

6 Claims. (Cl. 307—88.5)

This invention relates to pulse-train frequency dividers and to improvements in and modification of the invention disclosed in the application of K. W. Cattermole, Serial No. 441,055, filed July 2, 1954, now Patent 2,807,719, issued September 24, 1957.

The above mentioned application discloses a circuit for generating electrical pulses, comprising a crystal triode having a current gain greater than unity under normal operating conditions, a regenerative feedback circuit, having a periodic feature, arranged to couple the emitter and collector electrodes of the crystal triode in such manner that the crystal triode assumes one or the other of two different current conditions, at least one of which is unstable, and means for deriving the pulses from an electrode of the crystal triode, the arrangement being such that the period during which the crystal triode remains in one of the unstable conditions is substantially determined by the periodic feature of the regenerative feedback circuit.

Also described in Patent 2,807,719 is a type of crystal triode pulse circuit which can be used for frequency division by small factors. But, in common with many other circuits for frequency division, it is not suitable for division by large factors, because the dividing action depends on the stability of a long reset time which varies rapidly with change of supply potentials or properties of the elements of the circuit. To achieve stable division by factors of 20 to 30 in one stage, a form of timing dependent on passive components has been developed.

According to this invention there is provided a circuit, as disclosed in the above identified patent, and comprising means for feeding to the said circuit a train of timing pulses; a source of bias potential for inhibiting the firing of the said circuit by the said timing pulses; means for feeding to the said circuit a starting pulse which is capable of annulling the effect of the said bias potential, thereby enabling the said circuit to be fired by a pulse from the said train of timing pulses, so that the said circuit can produce a single output pulse, means for producing gating pulses each one of which is capable of annulling the effect of the said bias potential, thereby enabling the said circuit to fire repetitively and produce a train of output pulses, which means for producing gating pulses consists of a pulse spacing feedback network which derives each said gating pulse from the previously occurring output pulse once the said circuit has been fired by a said starting pulse.

Figure 1:
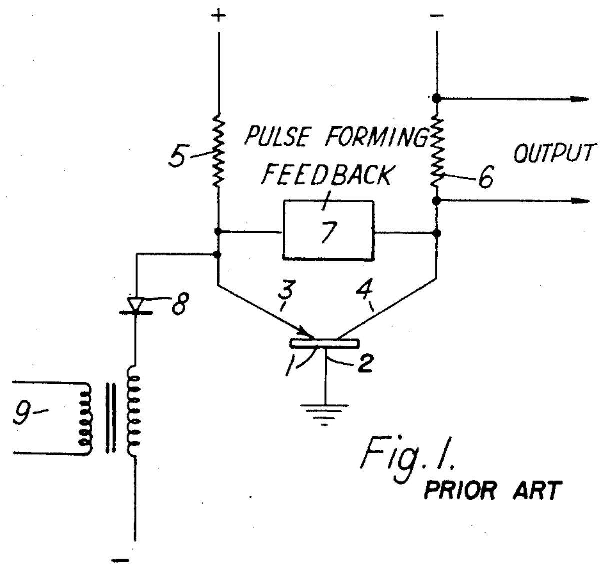
Figure 2:
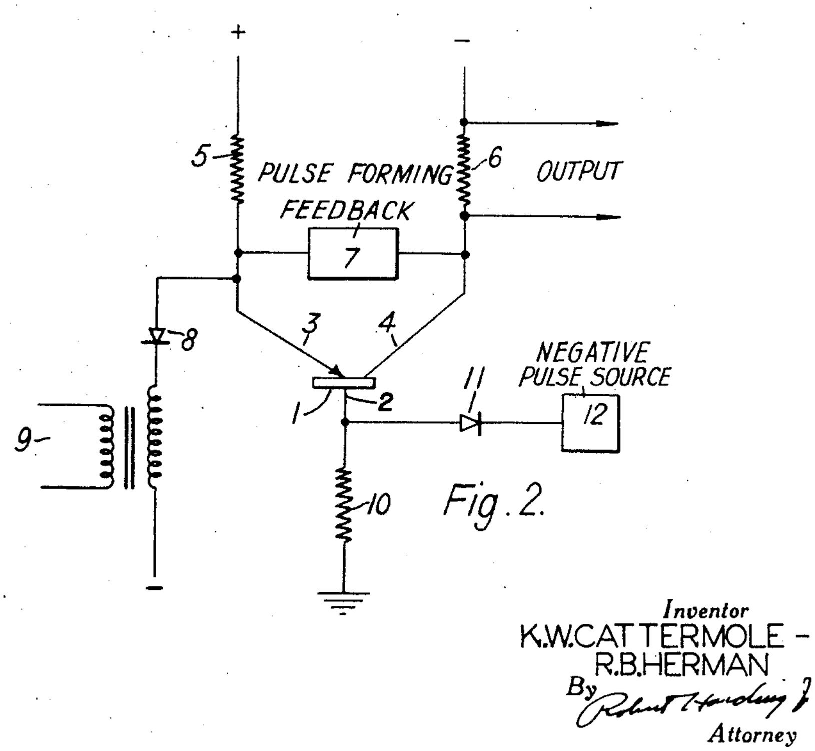
Figures 3, 4, 4A, 4B, 5:
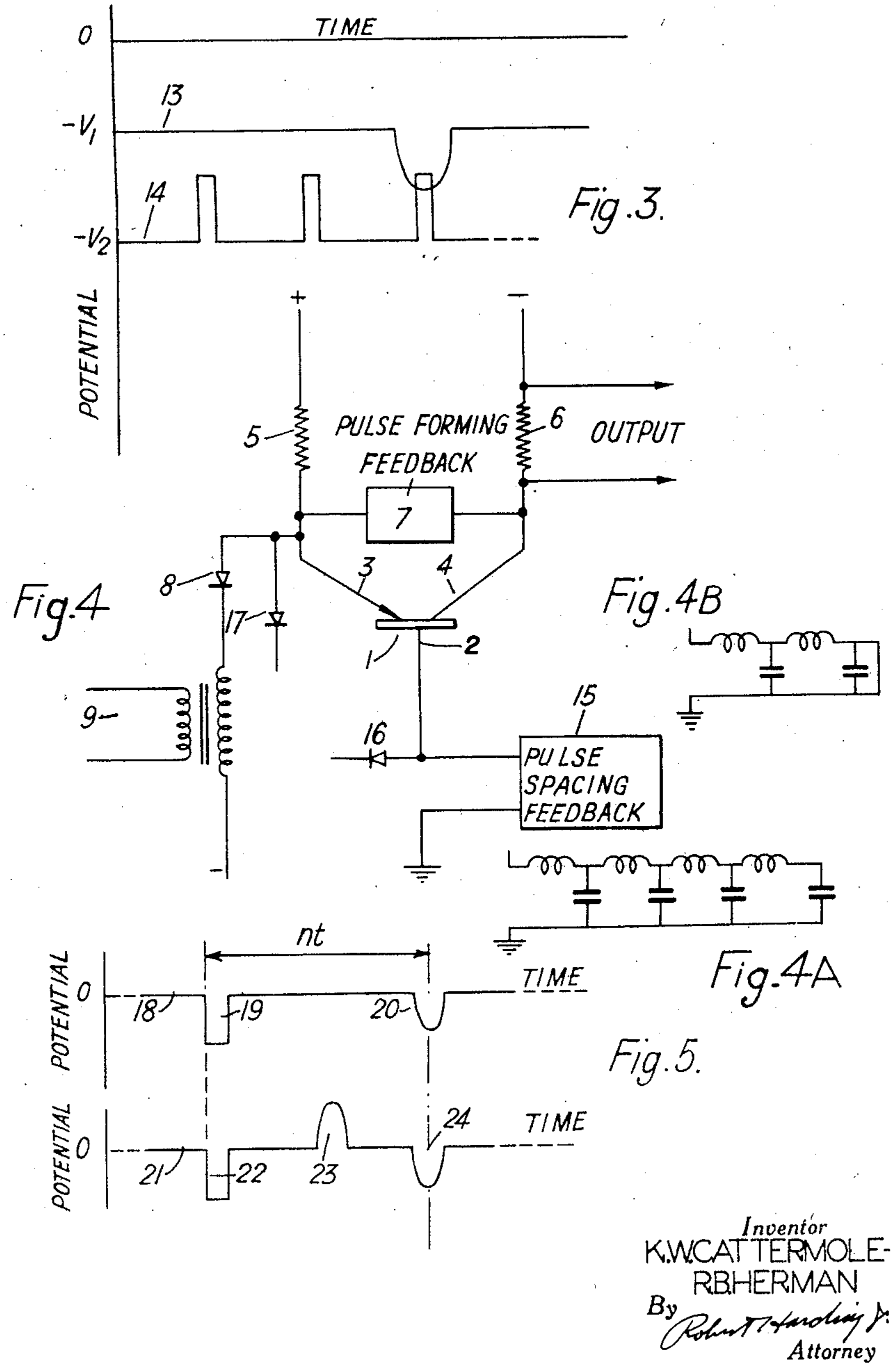

The invention will now be described with reference to the accompanying drawings in which:

Fig. 1 shows a schematic of the basic circuit of a triggered crystal triode pulse generator;

Fig. 2, a schematic of a modification of the circuit of Fig. 1;

Fig. 3, graphical representations of potential pulses for explaining the operation of Fig. 2;

Fig 4, a schematic of the circuit of a stable pulse-train frequency divider in accordance with this invention;

Figs. 4A and 4B illustrate open-end and shorted-end delay lines respectively used in the frequency divider of Fig. 4; and Fig. 5, graphical representations of potential pulses for explaining the operation of Fig. 4.

A known type of triggered crystal triode pulse generator which is described in the above identified patent, is shown in Fig. 1. It comprises a crystal triode 1 having a base electrode 2, and emitter and collector electrodes 3 and 4 respectively. This crystal triode is of the type that has a current gain greater than unity under normal operating conditions. The base electrode 2 is connected to ground. The emitter electrode 3 is connected through a resistance 5 to a source of positive potential, and the collector electrode is connected through a resistance 6 to a source of negative potential. The emitter and collector electrodes are connected together to provide regenerative feedback through a pulse forming network 7, such as an open-circuit delay line or a suitable L–C network. In the absence of the other elements shown in Fig. 1, the circuit as described is capable of generating indefinitely a train of regularly repeated pulses.

However, the emitter electrode is connected through a rectifier 8 to a negative bias potential, which holds the emitter sufficiently negative with respect to the base to maintain the crystal triode in the nonconducting condition. Also a source 9, which generates a timing pulse train, produces positive trigger pulses in the emitter circuit. The effect of a positive trigger pulse in the emitter circuit is to block the rectifier 8 from its negative bias. Consequently the emitter potential rises above the base potential, thereby causing the generator to fire and produce a single output pulse. After the generator has fired, a charge remains in the pulse forming feedback network which biases the emitter strongly negative, and the generator cannot therefore fire again until a certain recovery time has elapsed. When this time has elapsed, the generator fires again on the arrival of another trigger pulse. Consequently by suitable design of the pulse forming network, the frequency of the output pulses may be made a submultiple of the frequency of the timing pulse train. In practice, the frequency division thus obtained cannot, for reliable division, exceed a factor of, say, five.

A modification of the circuit of Fig. 1 is shown in Fig. 2, in which those elements which are the same as in Fig. 1 have the same designations. A resistance 10 is connected in series between the base 2 and ground. This has the effect of biasing the base very slightly negative resulting from the small collector current which flows when the crystal triode is in the non-conducting condition. But in the circuit in this figure the negative bias on the emitter is sufficiently negative to hold the emitter biased negatively with respect to the base even when the trigger pulses are applied. The base is also connected through a rectifier 11 to a source 12 producing a negative gating pulse, which drives the base potential even more negative. The amplitude of the gating pulse is such that it brings the potential of the base below that of the emitter, but only when the negative bias on the emitter is reduced by the arrival of a positive trigger pulse.

The operation of this circuit is illustrated graphically in Fig. 3, in which curve 13 represents the potential on the base and curve 14 the potential on the emitter. These curves are, however, not intended to represent a complete picture of the potentials on the two electrodes throughout the entire cycle of operation of the circuit, but simply to illustrate the relationship between the bias potentials and the trigger and gating pulses. The base is biased at a value of $-V_1$, say, and the emitter biased at, say, $-V_2$. The pulses on curve 14 are due to the arrival of the trigger pulses of the timing pulse train, and the negative pulse on curve 13 represents the arrival of the gating pulse. Only when a trigger pulse occurs during the period of a gating pulse does the potential of the emitter rise above the potential of the base. At this time the generator fires and produces a single output pulse.

Stable division by factors of 20 to 30 in one stage may be obtained from the stable divider generator shown in Fig. 4, in which those elements which are the same as in Figs. 1 and 2 have the same designations. Connected between the base 2 and ground is a pulse spacing feedback network 15, which is some suitable form of delay line. Also in the base circuit is a rectifier 16, through which a negative pulse can be applied to the base to start the operation of the generator. In the emitter circuit there is a rectifier 17, through which a negative pulse can be applied to the emitter to stop the operation of the generator. In the absence of a start pulse at the rectifier 16 the generator remains quiescent during the production of the timing pulse train in the emitter circuit, by virtue of the negative bias potential on the emitter, as explained in the case of Fig. 2. If a negative pulse is applied to the rectifier 16 so that the potential of the base is brought below that of the emitter during a trigger pulse, the generator will fire and produce a single output pulse. The delay line of the pulse spacing network is so arranged that the negative pulse arising in the base circuit as a result of the output pulse, is fed back after delay into the base circuit. This delayed feedback of the negative base pulse thus provides a gating pulse for again firing the generator. Therefore, once initiated by a single negative pulse at the rectifier 16 the generator continues to generate indefinitely a train of regularly repeated pulses, the frequency of which is a sub-multiple of the frequency of the timing pulse train. The operation of the generator may be stopped by applying to the rectifier 17 a single negative pulse, sufficiently negative to bring the emitter potential below the greatest negative excursion of the base potential, thereby inhibiting the firing of the generator.

To obtain frequency division by a factor of $n$, say, the total transmission time of the delay line, through which the base pulses are recirculated, must be $nt$, where $t$ is the time space between pulses in the timing pulse train. For large values of $n$ a simple delay line becomes prohibitively large or expensive. It is essential, therefore, for the circuit to be an economic proposition, to employ a delay line whose size and cost is moderate, while at the same time providing the required amount of delay. This problem can be solved by making the base pulse traverse the delay line several times before the generator fires. By use of an open-end line in the base circuit, as illustrated in Fig. 4B, a delay of $nt$ can be obtained by reflection of the base pulse from the far end of a line of length $\frac{1}{2}nt$. And by use of a shorted-end line, as illustrated in Fig. 4A, the same delay can be obtained from a length of only $\frac{1}{4}nt$, since on reflection at the far end the pulse is returned inverted to the base circuit which, as the transistor is non-conducting at that instant, presents a high impedance to the line, so that the pulse is reflected back without inversion down to the far end of the line again where it is again reflected and returned inverted to the base circuit. After this double reflection the pulse possesses its initial sense and serves as a gating pulse to fire the generator.

The pulses in the base circuit of Fig. 4 are shown graphically in Fig. 5. Curve 18 shows the pulses using an open-end delay line, the pulse 20, which is the gating pulse, being the reflection of the base pulse 19 after a time $nt$. Curve 21 shows the pulses using a shorted-end delay line. The pulse 23 is the inverted reflection of the base pulse 22, and the inverted reflection of pulse 23 is pulse 24, which serves as the gating pulse after a time $nt$.

Further reduction of the line length by a factor of two or three can be obtained by making use of the recovery time of the pulse forming feedback network 7. As previously explained in the description of Fig. 1, a charge remains on the pulse forming feedback network after the generation of each output pulse. This charge biases the emitter strongly negative so that the generator cannot fire again until a certain recovery time has elapsed. If the recovery time has not elapsed by the time the first gating pulse arrives at the base circuit, the generator cannot fire, and, as the crystal triode is non-conducting at that instant, the base circuit presents a high impedance to the gating pulse, which consequently is reflected back down the delay line again. This may happen a number of times before the recovery time has elapsed. If the generator is to fire on, say, the $r$th gating pulse, the recovery time must be greater than $nt0(r-1)/r$ but less than $nt$, where $n$ and $t$ have the same meaning as given previously. With such a recovery time, frequency division by a factor of $n$ can therefore be obtained with a short-circuit delay line of length of only $\frac{1}{4}nt/r$. The stability of the recovery time has to be slightly greater than that necessary for division by a factor $r$ in simple dividing circuits, such as described in Fig. 1. However $r$ may readily be two or three, and can be made greater if sufficiently accurate components and supply potentials be used.

As an alternative to employing a long recovery time in the pulse forming feedback network to obtain a reduction in the length of the delay line, the generator can be designed so that coincidence of a timing pulse and a gating pulse (a prerequisite for firing the generator) does not occur until after the first $(r-1)$ gating pulses, i.e. on the $r$th gating pulse. For this condition the gating pulses must be short and sharp, so that the ratio of delay to rise time of the line, and hence the number of sections, may be only slightly reduced. This system, however, can only apply to certain division ratios.

Several other basically similar arrangements to those described above with reference to Fig. 4 are possible, and they may turn out to be equally practicable or even to have some advantages. In Fig. 4 the two feedback functions, namely, pulse-forming and pulse-spacing, are provided by networks which are placed in two positions in the crystal triode circuit as emitter-collector admittance and base impedance, respectively. The allocation of the functions to the positions could be interchanged, or networks for both functions placed in one or other positions.

While the principles of the invention have been described above in connection with specific embodiments, and particular modifications thereof, it is to be clearly understood that this description is made only by way of example and not as a limitation on the scope of the invention.

What we claim is:

1. A circuit for generating electrical pulses comprising a crystal triode having an emitter, a collector, and a base electrode, and having a current gain greater than unity under normal operating conditions, a regenerative feed-back circuit coupling said collector and emitter electrodes, said feed-back circuit having a periodic characteristic, whereby said crystal triode will assume one or the other of two different current conditions, at least one of which is unstable and the period during which said crystal triode remains in said unstable condition being dependent on the periodic feature of said feed-back circuit, means for feeding a train of timing pulses to one of said electrodes which pulses are poled in a direction to fire said triode, a source of bias potential connected to said last-mentioned electrode, said bias potential having a value and polarity such as to inhibit the firing of said triode by said timing pulses, means for applying a starting pulse to an electrode of said triode of such magnitude and polarity as to annul the effect of said bias potential, thereby enabling said triode to be fired by a pulse from said timing-pulse-feeding means whereby said triode is fired, means comprising a pulse-spacing-feedback network connected in the base circuit of said triode for producing gating pulses each pulse being so poled and having such a magnitude as to annul the effect of said bias potential, thereby enabling said triode to fire repetitively, means for energising said pulse-spacing feed-back network when said triode is fired, and an output circuit connected to one of said electrodes, whereby an output pulse is produced each time said triode fires.

2. A circuit, as defined in claim 1, in which the periodic characteristic of the regenerative feed-back circuit is such that the triode will be prevented from firing for a period of time greater than the time interval between the pulses fed by the timing-pulse-feeding means.

3. A circuit, as defined in claim 2, in which the pulse-spacing-feed-back network comprises an open circuit-end delay line and is connected to the base electrode of the triode, whereby each gating pulse is derived from a pulse on said base electrode which occurs when said triode fires and which is reflected from the open end of said delay line.

4. A circuit, as defined in claim 2, in which the pulse-spacing-feed-back network comprises a shorted-end delay line and is connected to the base electrode of the triode, whereby each gating pulse is derived from a pulse on said base electrode which occurs when said triode fires and which is reflected twice from the shorted-end of said delay line.

5. A circuit, as defined in claim 1, in which the regenerative feed-back circuit has a periodic characteristic such that the period in which the crystal triode will remain in its unstable condition is greater than the time required for the pulse-spacing-feed-back network to produce a gating pulse after said network is energised by the firing of said triode, thereby causing said network repeatedly to produce said gating pulses which will be ineffective until said regenerative feed-back circuit operates to enable said triode to be fired again.

6. A circuit, as defined in claim 1, in which the pulse-spacing-feed-back network produces gating pulses which are coincident with every *r*th timing pulse of the timing-pulse-feeding-means where *r* is an integer less than 4.

References Cited in the file of this patent

UNITED STATES PATENTS

| | | |
|---|---|---|
| 2,533,001 | Eberhard | Dec. 5, 1950 |
| 2,644,893 | Gehman | July 7, 1953 |
| 2,758,208 | Grayson | Sept. 25, 1956 |
| 2,764,688 | Grayson et al. | Sept. 25, 1956 |
| 2,843,762 | Trent | July 15, 1958 |

FOREIGN PATENTS

| | | |
|---|---|---|
| 755,797 | Great Britain | Aug. 29, 1956 |